United States Patent Office  3,503,166
Patented Mar. 31, 1970

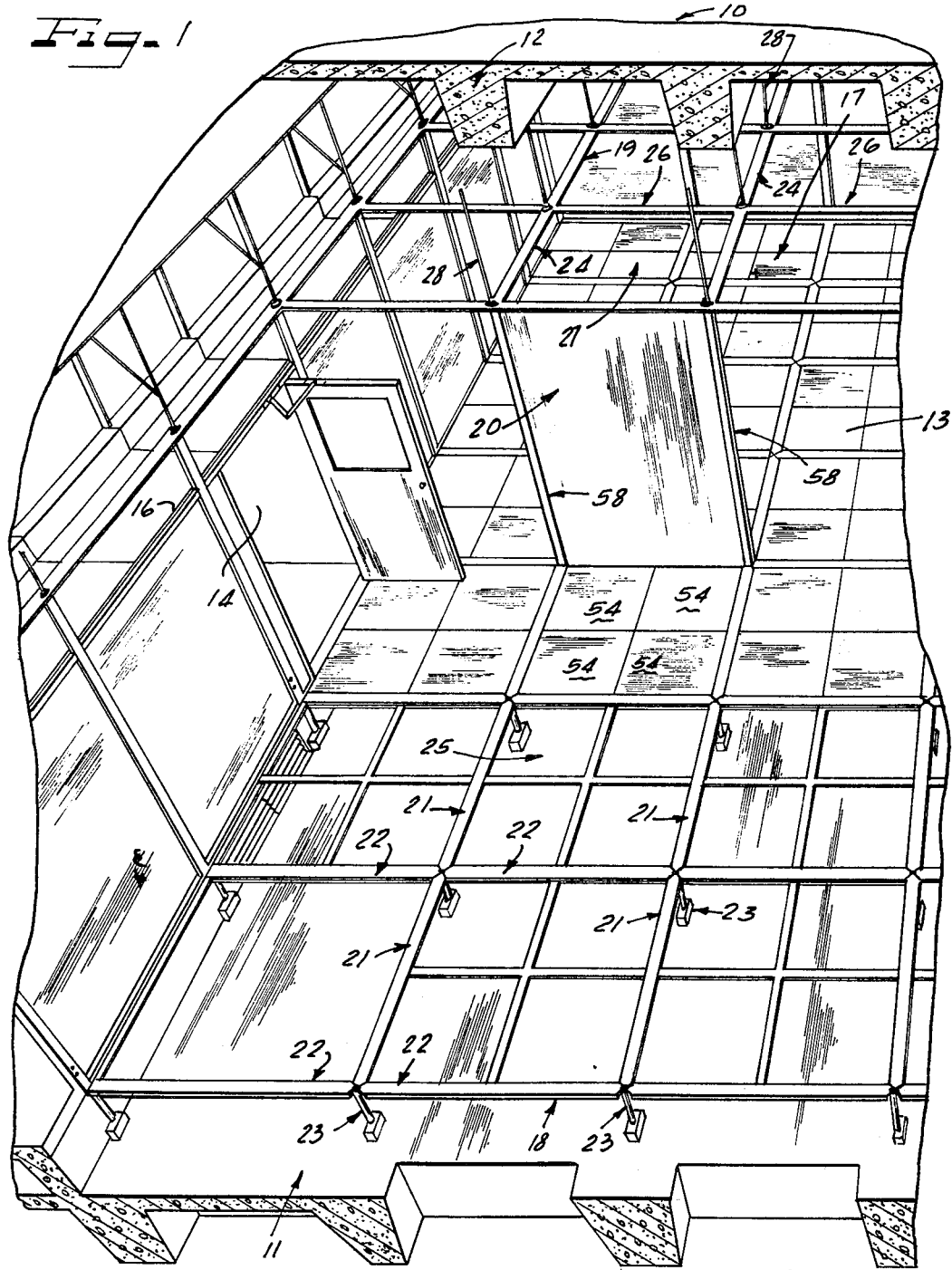

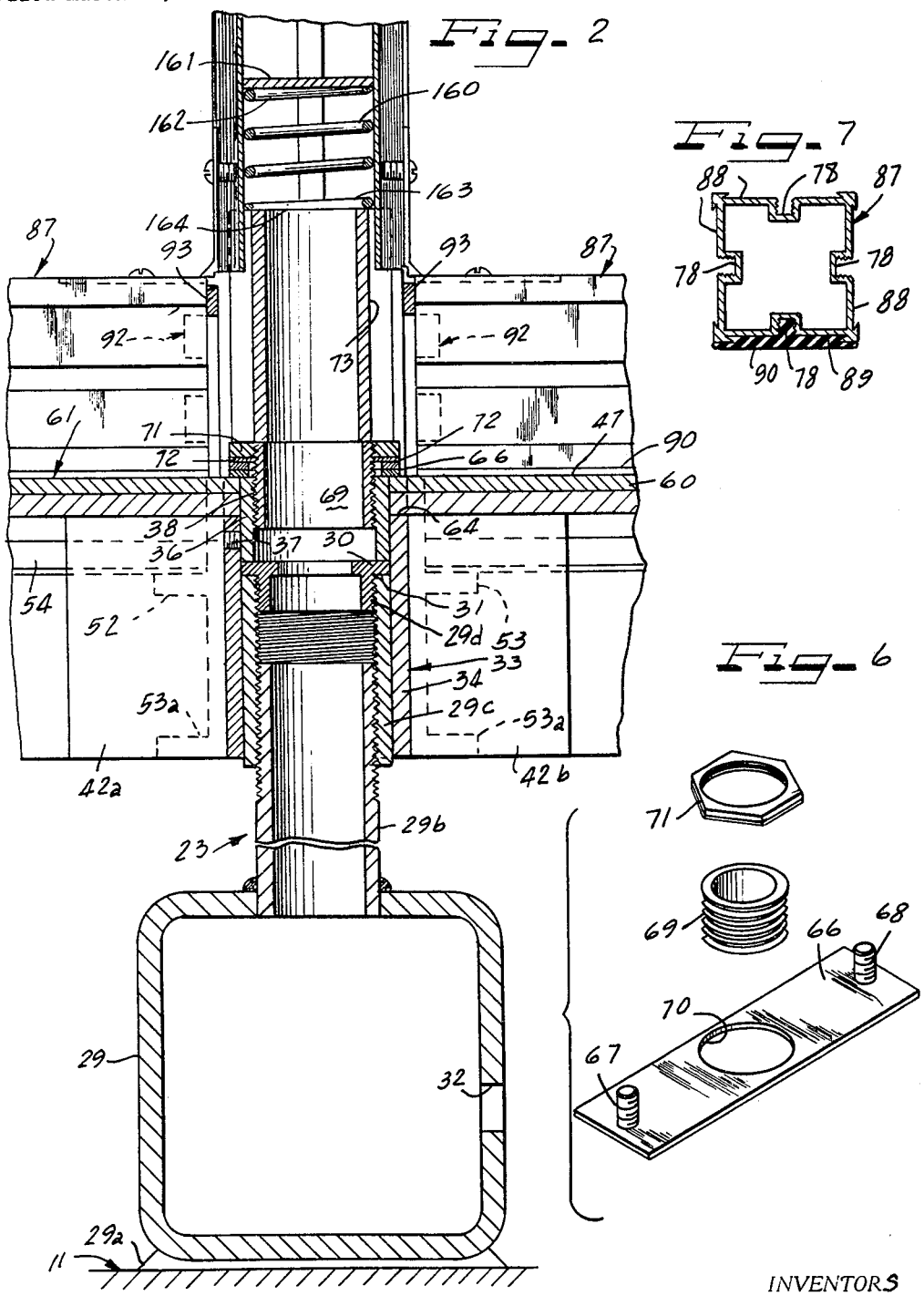

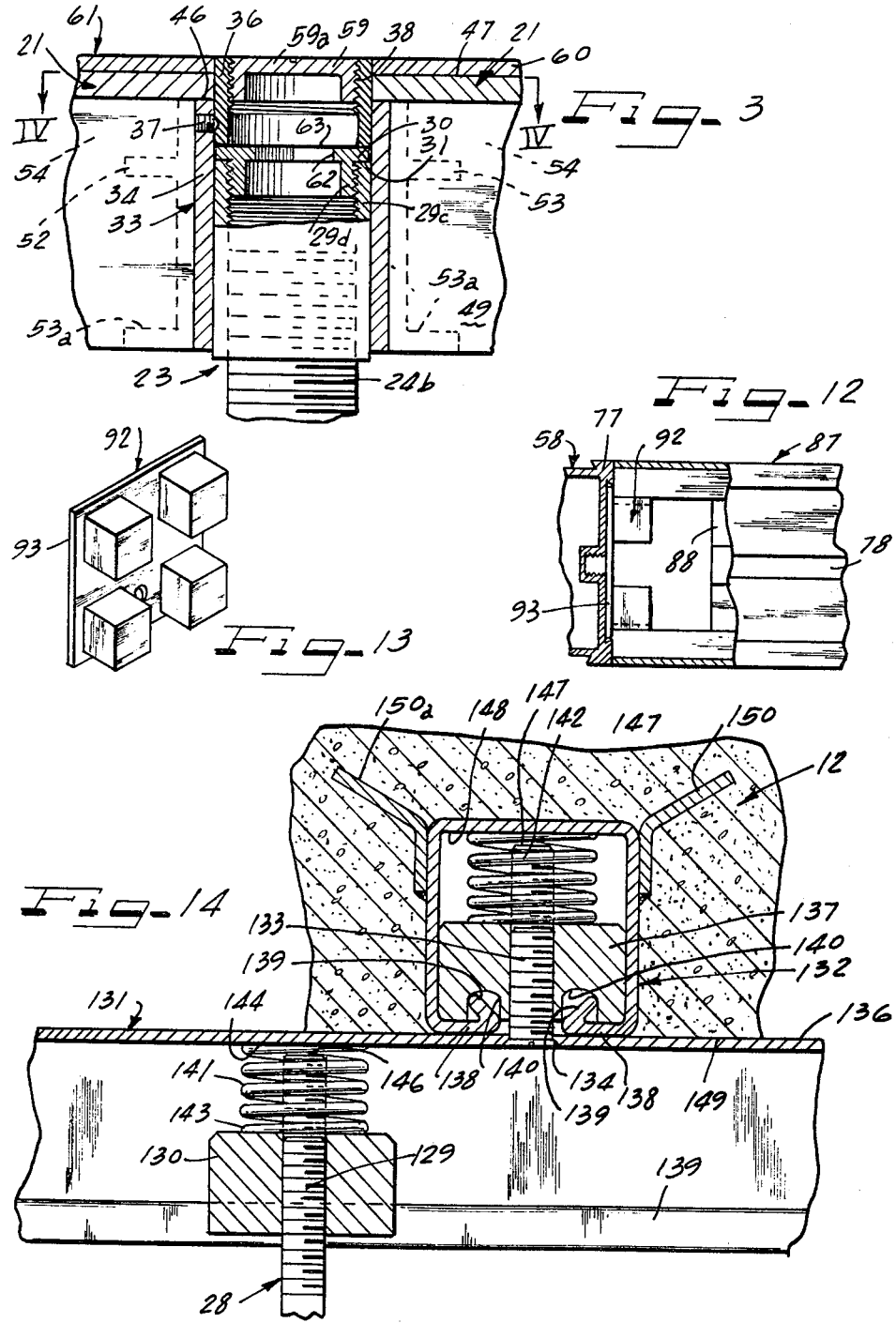

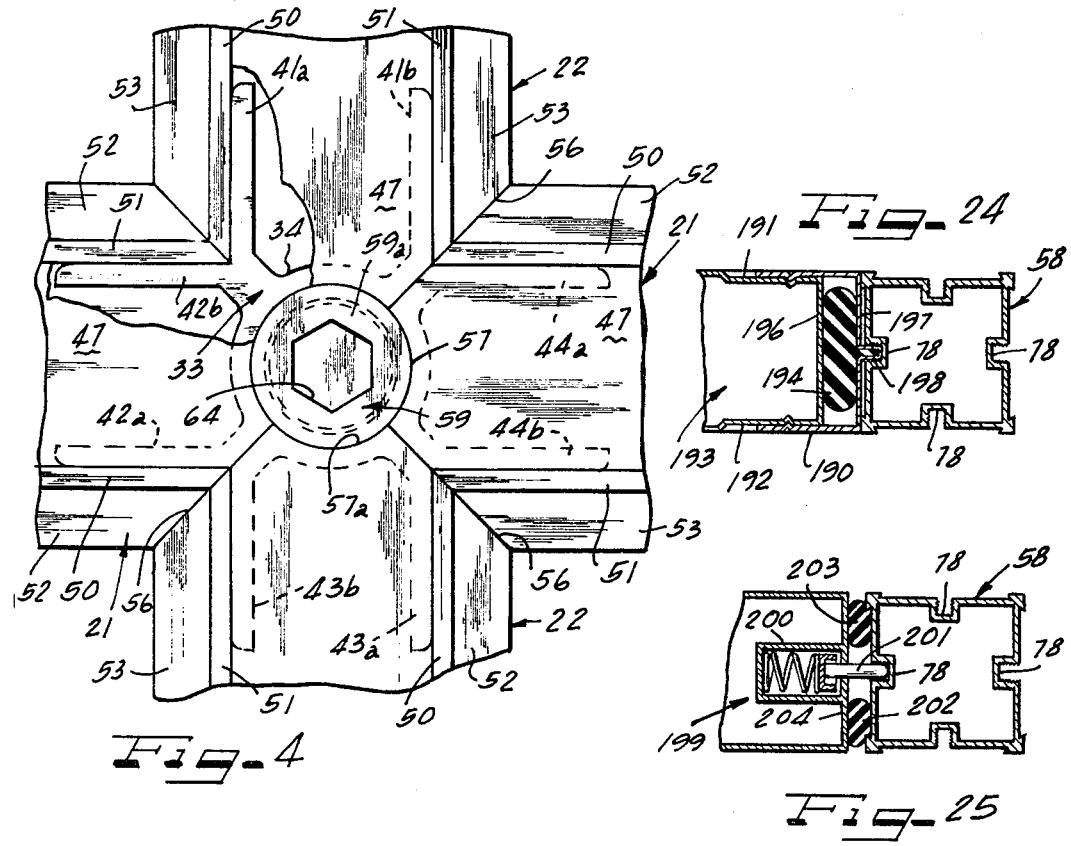
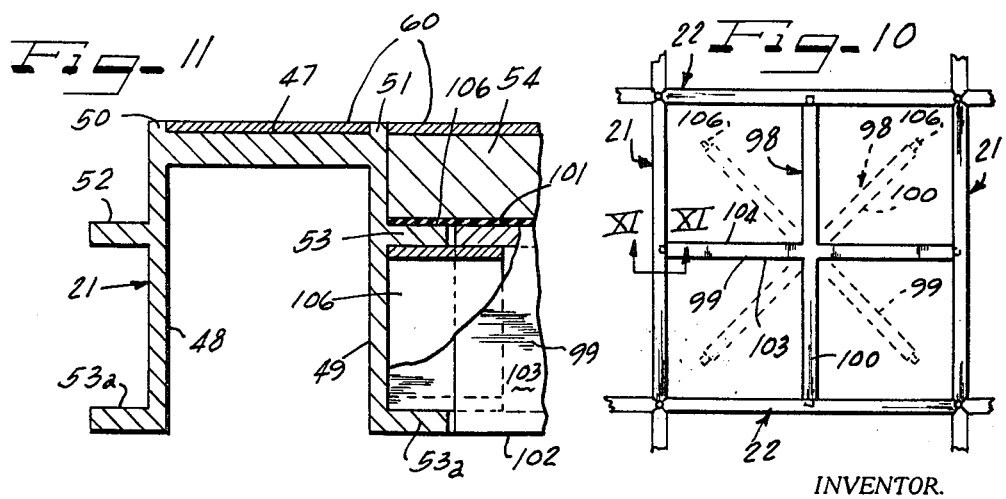

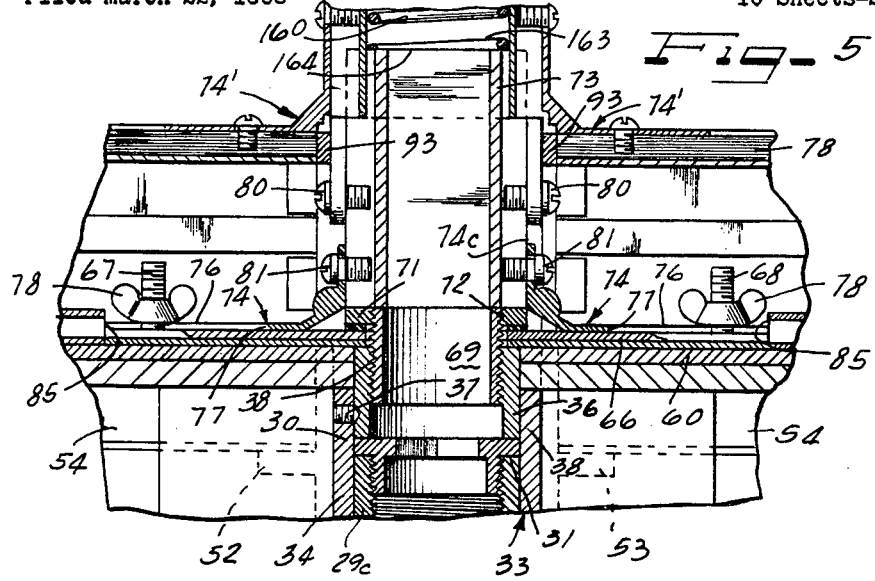
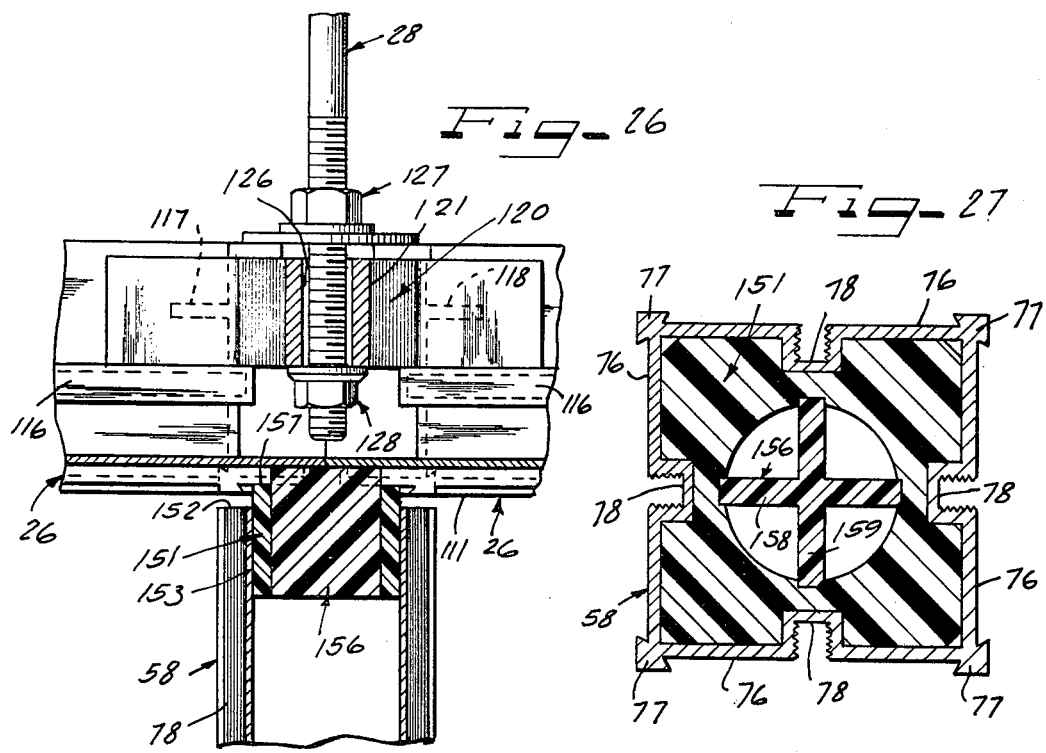

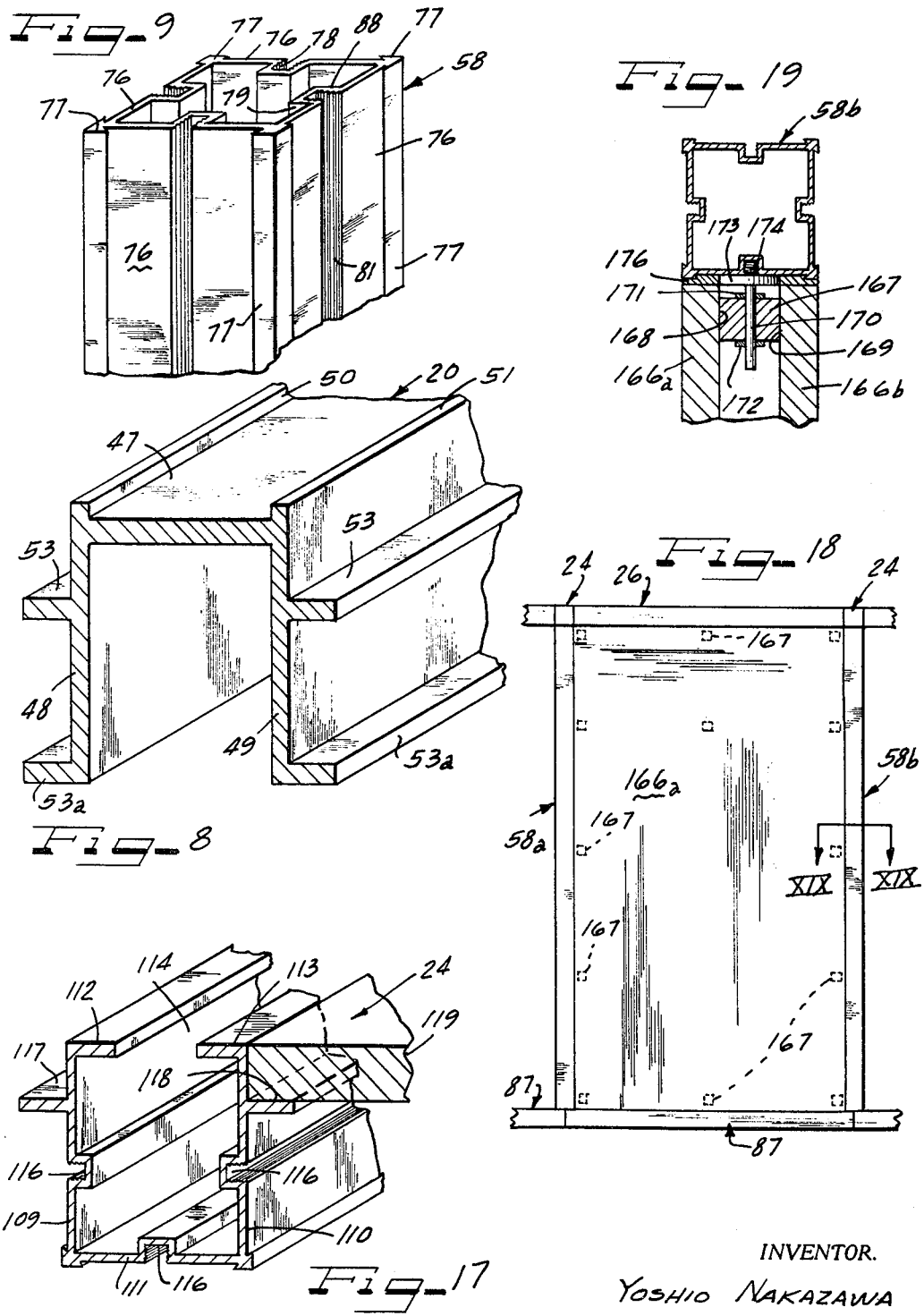

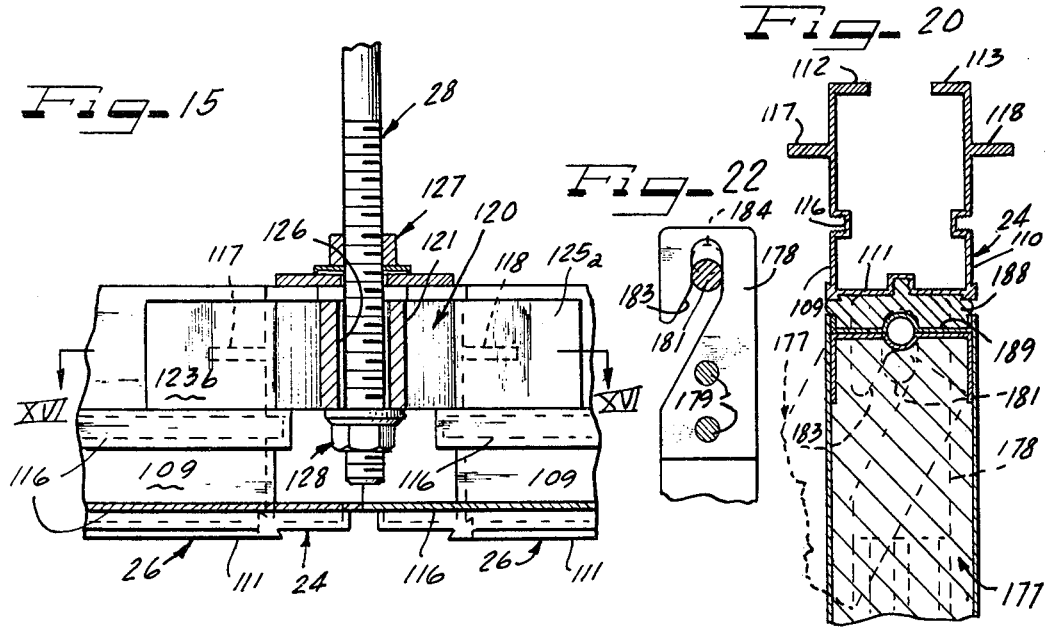

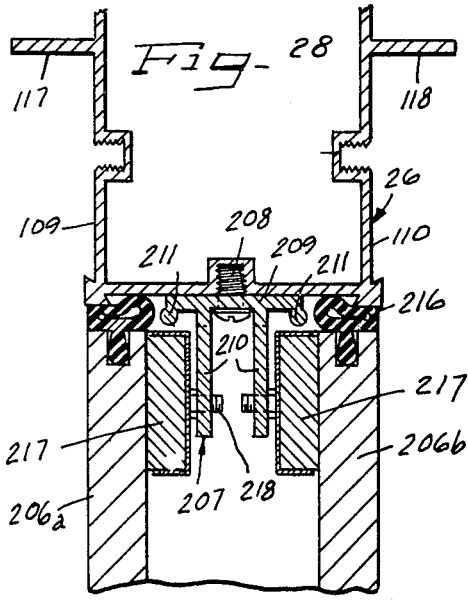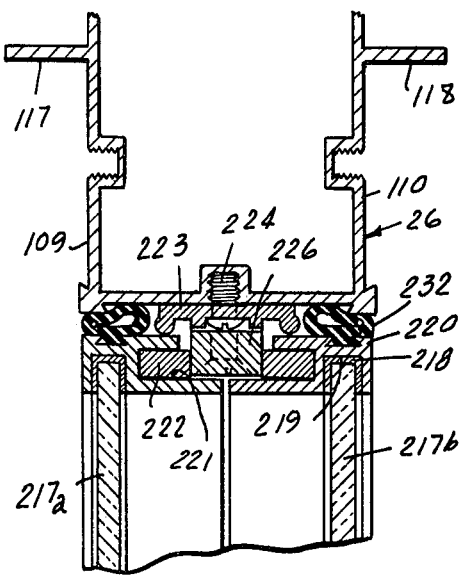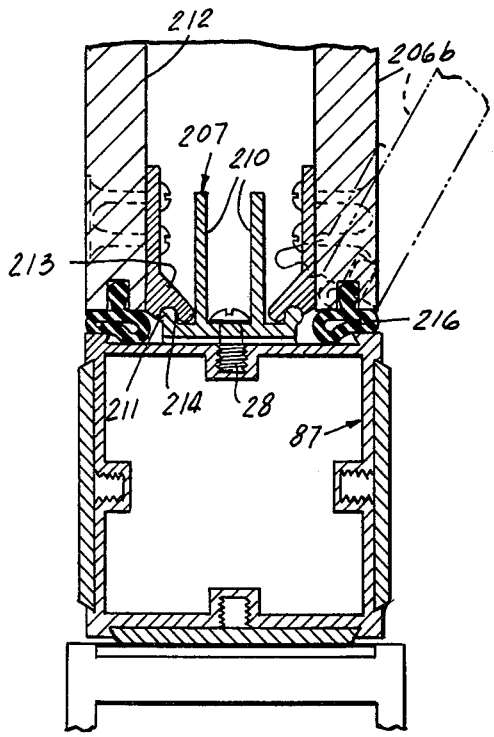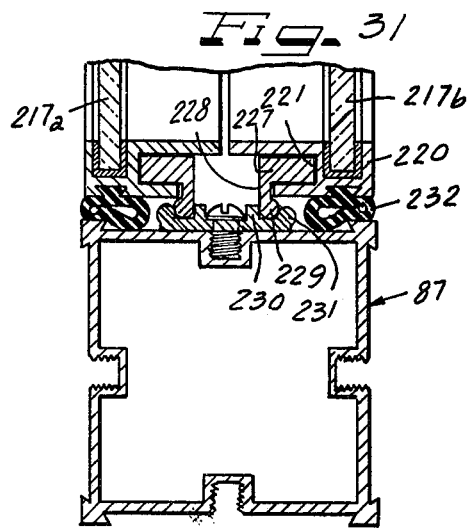

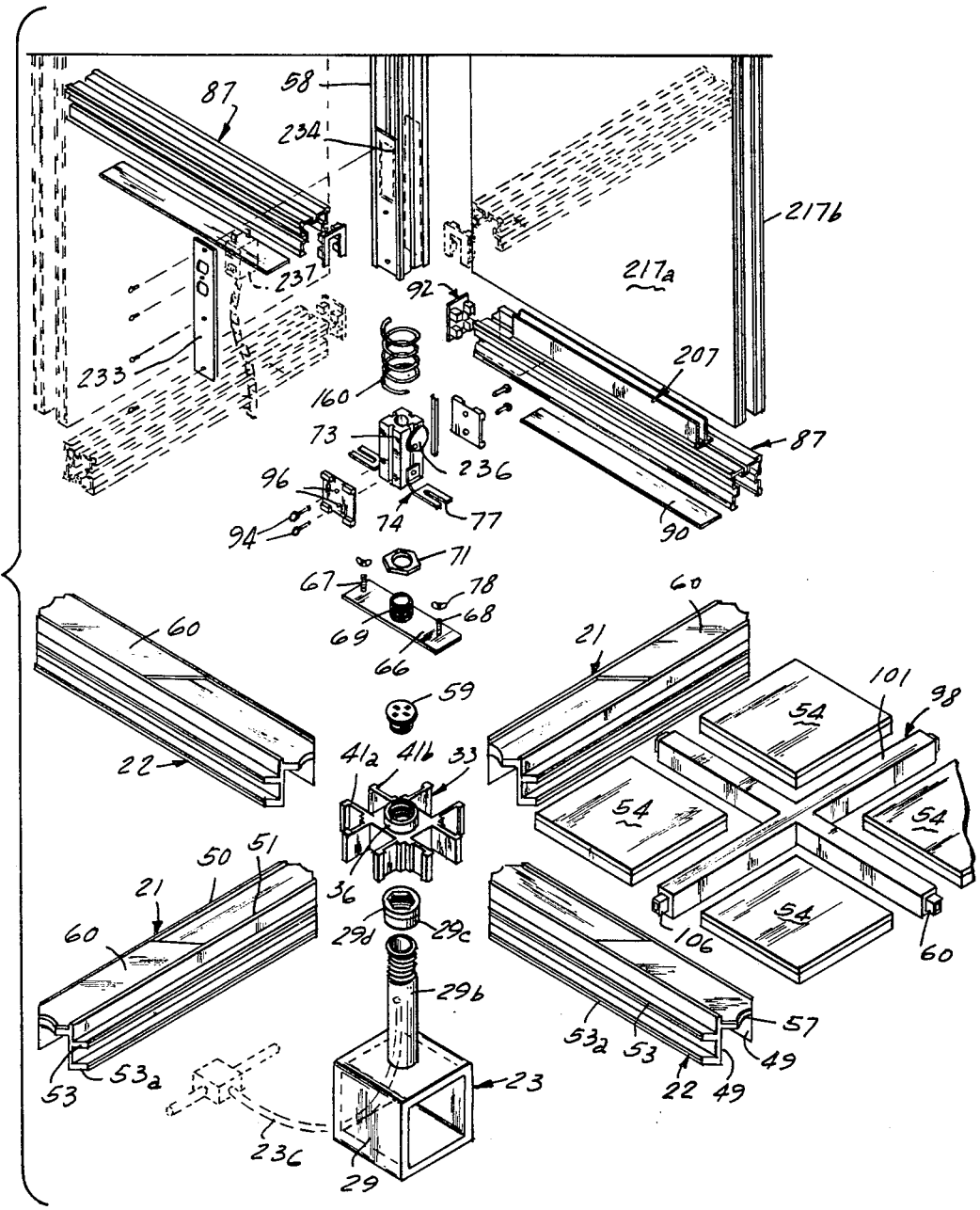

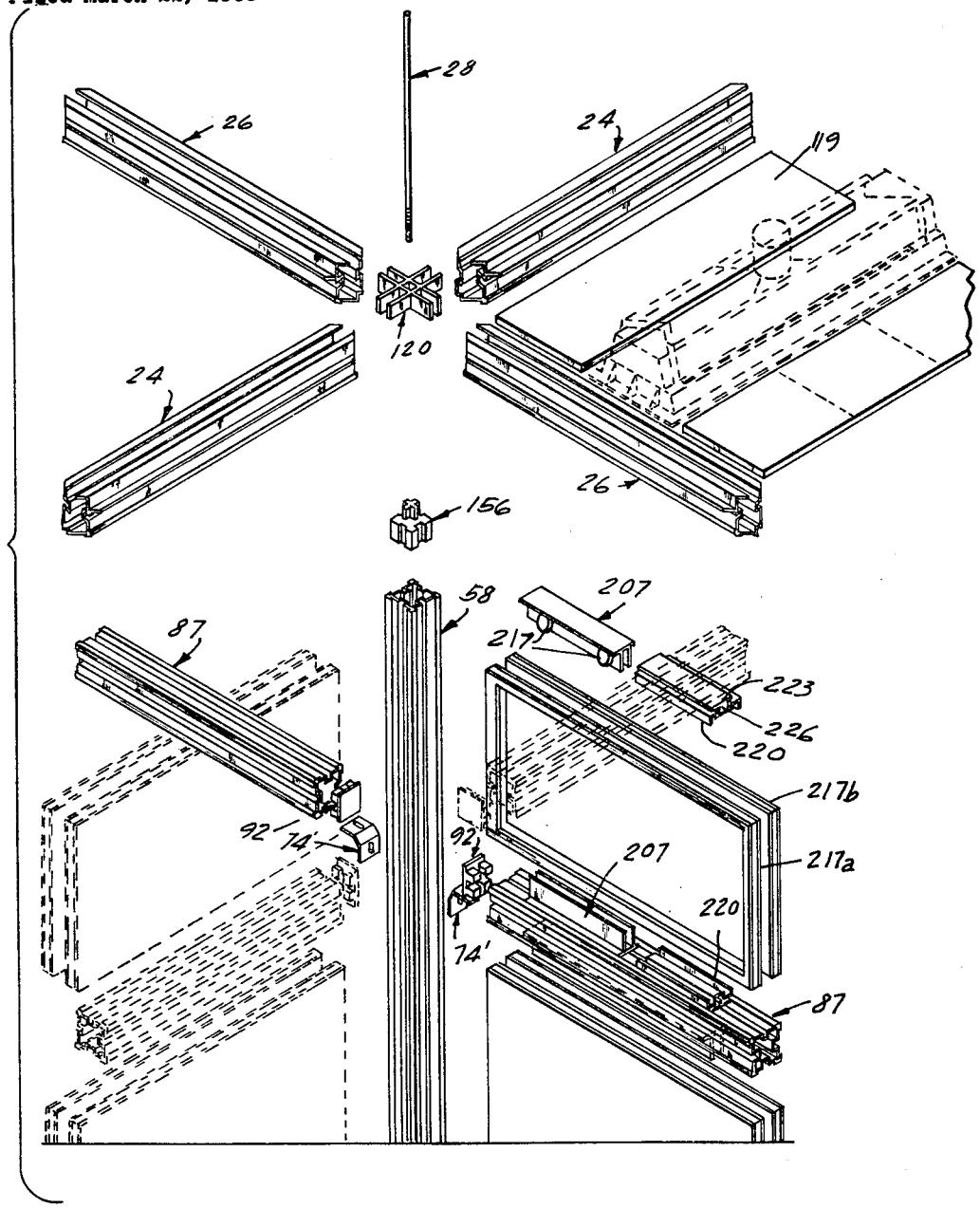

3,503,166
ARCHITECTURAL SYSTEM OF INTERIOR
MODULAR CONSTRUCTION
Yoshio Nakazawa, Evanston, and Harold A. Lipper, Chicago, Ill., assignors to Yosh Nakazawa & Associates, Inc., Evanston, Ill., a corporation of Delaware
Filed Mar. 22, 1968, Ser. No. 715,281
Int. Cl. E04b 5/10, 5/43, 5/58
U.S. Cl. 52—126                    4 Claims

ABSTRACT OF THE DISCLOSURE

An architectural system of modular construction for building structures including floor and ceiling rails or stringers forming rectangular floor and ceiling sections in vertical alignment with one another, pedestals adapted to be supported on a structural concrete floor for supporting the floor rails, suspension rods adapted to be hung from a structural concrete ceiling for supporting the ceiling rails and vertical corner posts which may be erected at the corners of any of the vertically aligned floor and ceiling sections to extend between the floor and ceiling rails. Panels for the floor and ceiling are supported in the same plane as the floor and ceiling rails on horizontal flanges extending from the floor and ceiling rails. Thus the panels are disposed adjacent the rails, and do not overly the rails. Partition wall panels may be mounted between the erected corner posts in abutting relation with the floor and ceiling rails for selective partitioning of the floor and ceiling sections. The pedestals are adapted for vertical adjustment from above the floor line without removing the floor panels and the corner posts and partition wall panels can be erected and removed without interference with the floor and ceiling rails and panels to provide for a highly flexible and easily altered modular construction.

BACKGROUND OF THE INVENTION

This invention relates generally to the field of building construction and more particularly to interior modular construction in which the architectural system is adapted to enable the floor plan and interior arrangement of a given space to be easily and quickly modified to accommodate changes in use and occupancy requirements of the building structure.

Numerous floor systems, movable partition systems and suspended ceiling systems are known in the prior art. Some of the systems permit modification of the floor plan of the building structure without substantial modification of the floor system while in other instances the partition walls, doors and the like can be rearranged without substantial modification of the ceiling system. None of the known systems, however, are adapted to provide complete flexibility and extensive modification of the floor plan without any substantial modification of either the floor system or the ceiling system.

SUMMARY OF THE PRESENT INVENTION

The present invention integrates a floor system, a movable partition wall system and a ceiling system into a single system of modular construction which provides an access floor, a suspended ceiling and an arrangement for removable partition wall panels, doors, windows and the like which can be erected and removed without any interference with or modification of the floor or ceiling.

Briefly, the architectural system of the present invention comprises a network of floor and ceiling rails or stringers which are supported respectively above and below a structural concrete floor and ceiling and arranged in a criss-cross or checkerboard manner to provide a plurality of rectangular floor and ceiling grid sections that are in vertical alignment with one another and which extend completely across a given space. The floor and ceiling rails include a first series which extends horizontally and in end-to-end relation in one direction in spaced parallel columns and a second series which extends transversely of the first series in spaced parallel rows.

The floor rails are supported on floor pedestal assemblies which are adapted for aligned placement on the structural concrete floor below the floor rails and at the corners of the floor sections so that each pedestal supports the ends of the four floor rails which come together at a corner of a floor section. Floor panels which may include vacuum outlets, piping slots, flush electrical outlets and the like are placed between the floor rails in each floor section and are supported along their edge portions on horizontal flanges which project from the floor rails. The pedestals are constructed and arranged for vertical adjustment after all of the floor panels have been placed in position so that the final elevational adjustments of the floor system can be made much more easily and quickly as the installers stand on the floor panels.

The ceiling rails are suspended from vertically adjustable rods hanging from the structural concrete ceiling. Ceiling panels which may include lighting fixtures, air conditioning fixtures and the like are disposed between the ceiling rails in each ceiling section and are supported along their edges on horizontal flanges projecting from the sides of the ceiling rails.

After the floor and ceiling systems have been completely installed the space can be partitioned in any manner desired. Assume, for example, that the space between one of the vertically aligned floor and ceiling sections is to be enclosed for use as a small office. Partition wall corner posts are erected at the four corners of the floor and ceiling sections. This is undertaken without the removal of any of the floor or ceiling panels due to the improved features of the floor and ceiling system of the present invention. Next the movable wall panels, door frames and the like are mounted between the corner posts as desired. The entire operation is quite simple and requires only minimum expenditures of time and labor. The removal of the wall panels and corner posts is an equally simple operation and the flexibility in any floor plan and the number of uses to which any space can be put are greatly enhanced by means of the present invention. The provision of these and other advantages is an important object of the present invention.

Other objects are to reduce the costs of interior modular construction, to standardize components of such construction, to render modular construction more desirable in terms of providing improved light-tight seals and noise barriers between partitioned spaces and to reduce the time, inconvenience, expense and skills necessary in the rearrangement of floor plans.

These and other objects, advantages and features of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWING

FIG. 1 is a perspective view of a portion of a building structure including an architectural system of modular construction embodying the principles of the present invention.

FIG. 2 shows a floor pedestal assembly and the end portions of floor rails and a center post supported thereby represented partially in vertical cross-section and partially in elevation.

FIG. 3 shows a portion of the pedestal assembly illustrated in FIG. 2 but with the corner post removed.

FIG. 4 is another view of the pedestal assembly and the floor rails taken along lines IV—IV of FIG. 3.

FIG. 5 is a fragmentary cross-sectional view of the pedestal assembly shown in FIG. 2 taken through a plane at right angles to the sectional plane of FIG. 2.

FIG. 6 is an exploded view of components shown in FIGS. 2 and 5 used in mounting the lower end of a corner post to the floor pedestal assembly.

FIG. 7 is a vertical cross-sectional view of lower partition wall panel rail taken along lines VII—VII of FIG. 2.

FIG. 8 is an isometric view of a floor rail with a portion thereof shown in vertical cross-section.

FIG. 9 is an isometric view of an end portion of a corner post.

FIG. 10 is a top plan view of a floor section showing a sub-stringer both in broken lines in the position thereof before assembly and in solid lines in the assembled position thereof.

FIG. 11 is an enlarged vertical cross-sectional view taken along lines XI—XI of FIG. 10 with a floor panel mounted in place adjacent a floor rail with the edge of the panel supported on a flange projecting from the floor rail.

FIG. 12 is a fragmentary top plan view of a lower partition wall panel rail connected to a corner post with portions cut away to reveal the fastening members.

FIG. 13 is a perspective view of a light-tight gasket shown in FIG. 12 used in connecting the lower partition wall panel rail to the corner post.

FIG. 14 is a sectional view of the upper portion of a ceiling hanger assembly used in hanging the suspended ceiling of the present invention from the structural concrete ceiling.

FIG. 15 is a sectional view of the lower portion of the ceiling hanger assembly shown in FIG. 14.

FIG. 16 is a horizontal sectional view taken along lines XVI—XVI of FIG. 15.

FIG. 17 is an isometric view of a ceiling rail with one end thereof shown in vertical cross-section.

FIG. 18 is a vertical elevational view of one embodiment of a partition wall assembly constructed in accordance with the principles of the present invention.

FIG. 19 is an enlarged cross-sectional view taken along lines XIX—XIX of FIG. 18.

FIGS. 20 and 21 are vertical cross-sectional views of another embodiment of a partition wall panel and its relation to the upper and lower partition wall panel rails, respectively, in the assembled position thereof.

FIGS. 22 and 23 are vertical elevational views of upper and lower mounting brackets used in the embodiment of the partition wall panel shown in FIGS. 20 and 21.

FIGS. 24 and 25 are fragmentary horizontal sectional views illustrative of other embodiments of partition wall panels and means for connecting same to corner posts or partition wall panel rails.

FIG. 26 is a vertical sectional view showing the upper of a corner post and the adjacent ends of the ceiling rails in a ceiling section.

FIG. 27 is a vertical sectional view taken along lines XXVII—XXVII— of FIG. 26.

FIGS. 28 and 29 are vertical cross-sectional views of another embodiments of a partition wall and its relation to the upper and lower partitional wall, panel rails, respectively, in the assembled position thereof.

FIGS. 30 and 31 are similar to FIGS. 28 and 29 but show another embodiment of a partition wall arrangement.

FIGS. 32 and 23 when taken together with FIG. 33 above FIG. 32 comprise an exploded isometric view of many of the parts illustrated in the other drawings to illustrate their relative disposition.

DESCRIPTION OF THE PREFERRED EMBODIMENTS

FIG. 1 illustrates pictorially a portion of a building structure indicated generally at reference numeral 10 in which is installed a system of modular construction embodying the principles of the present invention. The building structure 10 includes a structural floor 11 and a structural ceiling 12, both of which may be constructed of concrete or steel beams or the like. The building structure 10 may be multi-storied, in which event the structural concrete floor 11 may also serve as the structural concrete ceiling of the story below, and the ceiling 12 may also serve as the structural concrete floor of the story above.

In the embodiment illustrated the building structure 10 includes an area 13 separated from another area 14 by means of a wall 16. The two areas 13 and 14 may be used for the same or different purposes. For example, area 13 may be used as office or laboratory space, whereas area 14 may be used as corridor space.

An architectural system of interior modular construction which is constructed in accordance with the principles of the present invention and which is indicated generally at reference numeral 17 is installed in area 13 to enable the entire area to be partitioned in any manner desired in accordance with the uses to which the area is to be put and the requirements of the occupant. For example, it may be desirable to partition area 13 into a number of private offices, some larger than others. On the other hand the architectural scheme and floor plan may require the provision of some private offices along with larger rooms such as meeting rooms, conference rooms, reception rooms, etc.

By way of contrast area 13 may be intended to serve as laboratory space. In some instances a number of laboratories of different sizes may be desired. In any event one general requirement, regardless of the use to which the area 13 is to be put, is that each of the various modules into which the space is partitioned or into which it can be partitioned in the future includes means for providing proper lighting, heating and air conditioning, electrical power telephone wiring facilities, thermostatic and humidity control devices and piping for liquid or gas fluids. Otherwise very definite limitations would be placed on the flexibility and alterability of the partitioning and use of the space.

As the description of the present invention continues, the advantages of this system over systems presently known will become manifest, particularly since the present system affords maximum flexibility and the capability of being used in connection with the partitioning of any interior space susceptible of modular type construction.

The system of modular construction indicated at reference numeral 17 may be more particularly characterized as comprising a floor system 18, a ceiling system 19 and a partition wall system 20. The floor system 18 is raised above the structural concrete floor 11 to provide a utility space or plenum therebetween. This space may be used to house electrical conduits running to the various modules and corner posts, water and other piping, sheet metal air ducts, etc. The ceiling system 19 is suspended below the structural concrete ceiling 12 and in the space above the ceiling system 19 may be mounted lighting fixtures, heating and air conditioning apparatus and duct work, etc.

The floor system 18 includes a grid system of floor rails or stringers which includes a first series of rails indicated, for example, at reference numerals 21 and a second series indicated at reference numerals 22. The rails 21 extend horizontally in end-to-end relation in spaced parallel columns whereas rails 22 are disposed in rows extending transversely of the rails 21. Structurally, rails 21 and 22 are preferably identical to one another and may be of extruded aluminum or the like material. An area as indicated at reference numeral 25 which is bounded by four of the floor rails may be defined as a floor section. All of the floor sections 25 are preferably of the same size and square-shaped whereby a high degree of uniformity of the various components which comprise the present invention is attained. The ends of the floor rails 21 and 22 come together at the corners of the floor sections 25 and are supported at the corners by a plurality of floor pedestal assemblies indicated at reference numerals 23.

The ceiling system 19 is constructed complementarily to and in registry with the floor system 18. Included is a grid system of rails arranged in a criss-cross or checkerboard manner similar to the arrangement of the floor rails 21 and 22 and which comprises a first series of ceiling rails 24 which extend in one direction and a second series indicated at 26 which extend transversely of the first series. The ceiling rails 24 and 26 form ceiling sections 27 of the same size as and in vertical alignment with the floor sections 25. Thus the ceiling rails 24 are disposed directly above the floor rails 21, and ceiling rails 26 are directly above the floor rails 22.

The ceiling rails 24 and 26 are supported at their ends by a series of suspension rods indicated at 28. The suspension rods 28 are hung from the structural ceiling 12 by a suitable mounting arrangement illustrated in other figures of the drawings, particularly FIGS. 14–16.

Referring now to FIG. 2, each of the floor pedestal assemblies 23 comprises a base 29 supported on the structural floor 11. Structural adhesive may be applied between the base 29 and the structural concrete floor 11 as indicated at reference numeral 29a to hold the pedestal in place on the concrete floor.

Each assembly 23 also includes a vertical member such as a pipe 29b secured to the base 29, a tubular coupling 29c threaded to the pipe 29b and a collar 29d threaded on and then welded in fired assembly to the coupling 29c and having a radial shoulder 30 abutting an upper end 31 of the coupling 29c.

The base 29, the pipe 29b and the collar 29d are hollow to enable electrical conduit or the like to be run up through the floor pedestal assembly 23 from the utility space below the floor system 18 to a point thereabove, and for this purpose an opening 32 may be formed in one or more of the slides of the pedestal base 29.

Referring to FIGS. 2, 3 and 4, a floor rail connector 33 is supported on the collar 29d and comprises a tubular member 34 and a threaded bushing 36 secured to the tubular member 34 by means of a plurality of set screws as shown at 37 and threaded at an upper portion 38 thereof.

The floor rail connector 33 further comprises four pairs of horizontally extending fingers indicated at reference characters 41a and 41b–44a and 44b. The fingers of each pair extend in spaced parallel relation from the tubular member 34 and the four pairs are spaced circumferentially at 90° angles from each other. The height of the fingers are substantially equal to the heighth of the floor rails 21 and 22 to rigidify and to prevent twisting of the floor rails about their longitudinal axes.

The adjacent ends of the floor rails 21 and 22 are supported on a top wall 46 of the floor rail connector 33. As noted, the floor rails 21 and 22 are identical, and as shown in FIG. 8, are of a generally inverted U-shaped configuration having a top horizontal wall 47 and a pair of spaced parallel side walls 48 and 49 extending downwardly from the top wall 47. The distance between side wall 48 and 49 is sufficient to accommodate a pair of connector fingers such as 41a and 41b as illustrated in FIG. 4. The fingers thus prevent lateral movement of the floor rails 21 and 22 and in addition perform a supporting function for the rails.

The floor rails 21 and 22 further comprise a pair of vertically raised ribs 50 and 51 which extend along the longitudinal edges of the top wall 47. A pair of flanges 52 and 53 are situated below the top wall 47 and project horizontally away from the side walls 48 and 49 to support respectively an edge of a floor panel as indicated at reference numeral 54 in FIG. 1. Referring to FIG. 4, the adjacent ends of the floor rails 21 and 22 are beveled to form miter joints 56, as a result of which the floor rails are further maintained in snug locking relation with one another. The ends of the floor rails 21 and 22 are fragmentally circular shaped as shown at 57 to define with one another a circular bore 57a.

FIG. 3 illustrates the arrangement of a floor pedestal assembly 23 and the floor rails supported thereby at the corner of a floor section 25 which is not equipped with a corner post, one of which is indicated at reference numeral 58 in FIG. 1. In this arrangement a flush cap plate 59 is threaded into the bushing 36 to provide a flush surface 59a with the top of the bushing 36. A layer of tile or the like as indicated at 60 is laid between the ribs 50 and 51 and is flush to the bushing 36. The tile is also laid on the floor panels 54 to provide a completely level floor line 61.

The supporting height of the floor pedestal assembly 23 can be adjusted from above the floor line 61 with the floor panels 54 in place. For this purpose a square-shaped or other non-circularly shaped bore 62 is formed in a top wall 63 of the collar 29d to accept the complementarily-shaped working end of a tool such as a wrench or the like for threading the collar 29d and therefore the coupling 29c up or down on the pipe 29b. The plug 59 is, of course, removed during such adjusting or leveling operation and itself may comprise a pair of cross-slots, one of which is indicated at reference numeral 64, for facilitating removal by means of a suitable tool.

As noted, FIG. 3 shows the arrangement of the upper end of a pedestal assembly 23 when a corner post 58 is not installed thereon. FIG. 2, however, illustrates the same arrangement with a corner post installed. Therefore to FIGS. 2 and 6, where it is desired to erect a post 58 at the corner of a floor section 25, the plug 59 is removed and a post mounting plate indicated at reference numeral 66 is placed between the ribs 50 and 51 of a pair of longitudinally aligned floor rails 21 or 22. A pair of threaded studs 67 and 68 project upwardly from the plate 66 and a threaded bushing 69 is sized to extend through an aperture 70 for threading into the bushing 36. A nut 71 is threaded on the bushing 69 to hold the plate 66 tightly in place and to secure a gasket 72 between the nut 71 and the plate 66.

Referring to FIG. 9, the corner posts 58 are generally square-shaped in horizontal cross-section and include side walls 76 and arrowhead-shaped projections 77 at the corners of the side walls. A groove 78 having a pair of spaced parallel side walls 79 and 80 extends along the length of each of the side walls 76. The oppositely facing surfaces of walls 79 and 80 have a series of vertical lands and grooves formed therein as indicated at reference numeral 81 to provide a continuous threaded screw groove for receiving a complementarily threaded screw or the like fastening member at any point along the length of the side walls 76 of the center posts 58. The projections 77 are adapted to receive therebetween flexible plates or the like members which can be used to support a variety of articles and members from the corner posts. Such flexible plates may be adapted to slide along the length of the post 58 between a pair of arrowhead projections 77 but can be locked against movement at any point along the post by means of a suitable fastener threaded into one of the grooves 78.

The oversized relation of the opening 70 in the plate 66 to the bushing provides for lateral adjustability of the plate 66 and thus the bottom of the post 58 to accommodate possible misalignment between the floor and ceiling systems 18 and 19. A vertically upstanding hollow insert 73 shaped complementarily to the inside of the post 58 bottoms on the bushing 69 and the nut 71 and is adjustably secured in place by means of a pair of clips 74, 74 each of which includes a horizontal leg 76 which is slotted as at 77 to receive one of the studs 67 and 68 projecting from the plate 66, and which is secured to the plate by means of a wing-nut 78, and which also includes a vertical leg 79 which is secured to the insert 73 by means of a pair of screws 80 and 81. A layer of gasketing material 82 is provided between the plate 66 and the top wall 47 of each of the floor rails 21 and 22.

As illustrated in FIGS. 2 and 5, all of the various components which comprise the pedestal assembly 23 provide a hollow passage extending from the base 29 all the way up to and into the corner post 58, thus electrical conductors and the like can be run from the utility space between the floor system 18 up through the pedestal assemblies 23 and into the corner posts 58 without being exposed and without extending through any of the floor panels.

The posts 58 are erected, of course, only at the corners of the floor and ceiling sections 25 and 27 which are to be divided or enclosed with partitioning walls. Mounted between the posts 58 along the floor line are lower partition wall panel rails as indicated in FIGS. 2 and 7 at reference numerals 87. The rails 87 are similar to the posts 58 and both may be extruded from the same die. The rails 87 also include threaded screw grooves on each of four sides 88 thereof extending the full length of the rails 87, as indicated at reference numerals 78, the same reference numerals which indicate similar screw grooves in the corner posts 58.

The bottom wall 89 of each of the rails 87 is cut short of the adjacent post 58 as at 85 to accommodate the threaded studs 67 and 68 projecting upwardly from the post mounting plate 66 and nuts 75 threaded thereon. The rails 87 are of the same widths as and overlie the floor rails 20 and as shown in FIG. 2, a layer of tile or the like material 60 which is placed over all of the floor panels 54 is also placed between the ribs 51 of the floor rails 20. As indicated at 90 a layer of compressible material such as rubber or other gasketing material is secured to the bottom wall 89 of the rails 87 to provide a light-tight seal thereacross.

The ends of the lower partition wall panel rails 87 are secured to the posts 58 by means of mounting brackets indicated in FIGS. 2, 5, 12 and 13 at reference numerals 92. The brackets 92 each comprise a face plate 93 which is disposed between the end of a rail 87 and the insert 73 and is secured thereto by means of a pair of screws 94 (FIG. 32) which extend through openings 96 formed in the face plate 93 and which are threaded into the insert 73. Protuberances 97 project from the back face of the plate 93 and into the end of the rail 87 to rigidify the plate 93 and to prevent axial twisting of the rail.

In order to provide vertical support for the two edges of each of the floor panels 54 which do not confront and which are not supported by the floor rails 21 and 22 a sub-stringer as indicated at reference numeral 98 in FIG. 10 is mounted between each of the sets of floor rails 21 and 22. The cross-brace 98 comprises a pair of arms 99 and 100 which intersect at right angles. The arms 99 and 100 are hollow and have flat parallel top and bottom walls 101 and 102 and flat parallel side walls 103 and 104. Telescoped into the ends of the arms 99 and 100 and welded or otherwise bonded fast thereto are rectangularly shaped tubular inserts 106 which project between the flanges 53 and 53a of the floor rails 20 and 21 in the installed position of the sub-stringer 98.

During installation the sub-stringer 98 is placed between pairs of parallel floor rails 21 and 22 and then turned from the position thereof shown in dashed lines in FIG. 10 to the position thereof shown in the full lines. The inserts 106 are dimensioned to provide a slight interference fit with the flanges 53 and 53a so that when the sub-stringer 98 is turned to its assembled position it is maintained in such position by a frictional force between the inserts 106 and the flanges 53 and 53a. The top walls 101 of the arms 99 and 100 are flush with a top wall 106 of the flanges 53.

Referring now to FIGS. 15 and 16, the ceiling rails 24 and 26 come together in abutting engagement at the corners of the ceiling sections 27 and are mitered at the abutting ends thereof as shown at 108. The ceiling rails 24 and 26 are identical and may be made of extruded aluminum or the like and as shown in FIG. 17 each comprises a pair of spaced vertical side walls 109 and 110 on the bottom wall 111. The upper ends of the side walls 109 and 110 are inturned as at 112 and 113 to provide a groove 114 extending along the length thereof.

Threaded screw grooves 116 similar to the grooves 78 of the corner posts 58 are formed in the side and bottom walls 109–111 and a pair of horizontally extending flanges 117 and 118 project from the side walls 109 and 110 for supporting ceiling panels of the suspended ceiling system 19, a portion of one such ceiling panel being indicated at reference numeral 119.

The abutting ends of the ceiling rails 24 and 26 are supported by means of a ceiling rail connector 120 which is constructed generally similarly to the floor rail connector 33. Thus the ceiling rail connector 120 comprises a central hub portion 121 from which four pairs of fingers extend at right angles to one another as indicated at 122a–122b to 125a125b. The fingers extend between the side walls 109 and 110 of the ceiling rails 24 and 26 and support the rails at the inturned flanges 112 and 113.

The hub 11 is centrally apertured as at 126 to receive a suspension rod 28 and the connector 120 is mounted for vertical adjustment on the rod 28 by means of threaded nut and washer assemblies 127 and 128 situated respectively above and below the connector 120.

Referring to FIG. 14, an upper end 129 of an exemplary suspension rod 28 is threaded into a nut 130 disposed within a channel member 131. The channel member 131, in turn, is connected to a second channel member 132 by means of a threaded stud 133 which extends up through a chamfered counterbore 134 formed in a top wall 136 of the channel member 131. The stud 133 is threaded into a nut 137 which is disposed within the second channel member 132.

Both of the channel members 131 and 132 are similar in construction and comprise a pair of bottom flanges 138 having out-turned ears as at 139. The nuts 130 and 137 are also similar to one another and each comprise a pair of grooves 140 which receive the out-turned ears 139 of the channel members.

A pair of spring members 141 and 142 are disposed respectively within the channel members 131 and 132 and are fixedly connected to their respective nuts 130 at bottom ends 143 by means of a weld or the like connection. An upper end 144 of the springs abuts the top wall of its respective channel member.

The suspension rod 28 and the nut 130 are movable along the length of the channel member 131 to align the suspension rod 28 in one direction. The rod 28 can then be locked in position in this one direction by threading the rod into the nut 130 until an upper end 146 of the rod abuts the top wall 136 of the channel member 131.

Similarly, the channel member 131 is adjustable in a second direction which is transverse to the longitudinal axis thereof by threading the stud 133 outwardly so that an end wall 147 thereof is moved out of abutting engagement with a top wall 148 of the channel member 132. After the channel member 131 has been adjusted in this transverse direction the stud 133 is threaded into abutting engagement with the top wall 148 of the channel member 132 to lock the channel member 131 in place.

The springs 141 and 142 bias the nuts 130 and 137 downwardly whereby the out-turned ears 139 of the channel members 131 and 132 remain seated in the grooves 140, thereby permitting adjustment of the rod 28 and the stud 133 without the necessity of holding the nuts 130 and 137 against rotation.

The channel member 132 is embedded within the structural concrete ceiling 12 and the bottom flanges 138 thereof are flush with a bottom wall 149 of the concrete floor 12. A pair of wing flanges 150 and 150a are formed on the channel member 132 to provide a firm anchor and to preclude pulling of the channel member 132 out of the structural concrete ceiling 12.

The upper ends of the vertical corner posts 58 are secured to the ceiling system 19. Referring to FIGS. 26 and 27, a mounting block 151 is telescoped into an upper end 152 of an exemplary corner post 58. The outer wall construction 153 of the block 151 is generally similar to the inside wall construction of the posts 58. The central portion of block 151 is bored as at 154 and a cross-connector 156 is depressed within the bore 154.

The block 151 is preferably constructed of a resilient material and a top wall 157 thereof abuts the bottom walls 111 of the ceiling rails 24 and 26 to form a light-tight seal. The cross-connector 156 is bonded by suitable means such as cement to the block 151 and comprises a pair of cross arms 158 and 159 which project upwardly beyond the top wall 157 of the block 151 to seat in the threaded screw grooves 116 of the ceiling rails 24 and 26.

In erecting a corner post 58 it is necessary that the post be lowered sufficiently to enable the top of the cross-connector 156 to pass under the bottom wall 111 of the ceiling rails 24 and 26 until the cross-connector is in vertical alignment with the grooves 116 formed in the bottom walls 111.

Referring to FIGS. 2 and 5 a bottom wall 160a of the erected corner post 58 is spaced above the nut 71. A spring 160 is housed in the lower end of the post 58 and a top end 162 thereof abuts a fixed plate 161 and a bottom end 163 abuts an upper end 164 of the insert 73. The erected post 58 is therefore biased upwardly away from the floor system 18 and toward the ceiling system 19.

In erecting a post 58 the plate 66 is mounted in place, then the insert 73 is mounted thereon by means of the clips 74 and the lower end of the post 58 is telescoped over the insert 73. The post 58 is then urged downwardly against the bias of spring 160 so that the top of the cross-connector 156 passes beneath the bottom wall 111 of the ceiling rails 24 and 26. After the cross arms 158 and 159 are vertically aligned with the screw grooves 116 in the bottom wall 111, the post is released to enable the spring 160 to provide an upward bias to seat the cross arms 158 and 159 in place in their corresponding screw grooves 116.

Between the corner posts 58 various enclosure components such as wall panels may be erected. For example, referring to FIGS. 18 and 19, a pair of corner posts identified at 58a and 58b are erected between the lower partition wall panel rails 87 and the ceiling rails 24 and 26. A wall panel structure 166 is installed between the posts 58a and 58b and extends from the panel rails 87 to the ceiling rails 24 and 26.

In the embodiment shown in FIGS. 18 and 19 the enclosure includes a pair of wall panels 166a and 166b which are mounted in spaced parallel relation to form a double-wall enclosure panel. In this embodiment the edge portions of panels 166a and 166b are constructed of suitable magnetic material and the panels are secured to posts 58a and 58b as well as to the lower partition wall panel rail 87 and the ceiling rail 26 by means of a plurality of magnets indicated at reference numerals 167. Each of the magnets 167 has a pair of flat side walls 168 and 169 abutting the walls of the panels 166a and 166b and is mounted on a rod 170 by means of a pair of lock washers 171 and 172. A disc-shaped flange 173 is also formed on the rod 170 and one end 174 of the rod is threaded complementarily to the threaded screw grooves 78 of the posts 58a and 58b and the lower rails 87 as well as to the grooves 116 of the ceiling rails 24 and 26. The number and spacing of the magnets 167 will generally depend upon the size and weight of the wall panels 166.

A layer of resilient material such as rubber is bonded to the edges of the panels 166 as indicated at reference numeral 176 to provide a light-tight seal.

Another embodiment of a wall construction is shown in FIGS. 20–23 wherein a single-wall panel structure indicated at 177 is adapted for installation between a pair of corner posts 58. In this embodiment a hook member 178 is mounted on the inner wall of each of the pair of corner posts 58 near the upper end thereof by means of a pair of studs 179 threaded into the screw grooves 78 of the corner posts 58. A cooperating hook member 180 is mounted on each of the corner posts 58 at the lower end thereof.

Projecting from the upper end of each of the opposite side walls of the panel 177 is a shaft 181. Another shaft 182 projects from the bottom ends of the panel side walls.

To install a panel 177 the upper end is moved into position below a corresponding ceiling rail 24 or 26 as indicated in the broken lines in FIG. 20 so that the shafts 181 are moved up into a groove 183 formed in the upper hook members 178 to a position shown in broken line FIG. 22 at reference numeral 184. Then the lower end of the panel 177 is moved into a vertical position so that the shafts 182 are received in slots 186 formed in the lower hook members 180. The panel 177 is then released so that the shafts 182 move to a lower portion 187 of the grooves 186 and are locked therein and the upper shafts 181 move down a slight distance in the slots 183 of the upper hook members 178 where they are locked therein.

A layer of compressible material 188 may be bonded to an upper wall 189 of the panel 177 to provide a light seal while accommodating the necessary movement of the shafts 181 in the slots 183 necessary for the installation of the panels 177.

Other embodiments of single-wall panels constructed in accordance with the principles of this invention are disclosed in FIGS. 24 and 25. In FIG. 24 a rectangular sleeve 190 is telescoped over side walls 191 and 192 of a wall panel 193. A strip 194 of compressible material such as rubber is disposed between end wall 196 of the panel 193 and end wall 197 of the sleeve 190 to bias the sleeve 190 away from the panel and into abutting engagement with the corner post 48. A protuberance 198 is formed on the wall 197 to project into the threaded screw groove 78 of the corner post 58 as well as into the screw grooves 78 of the lower partition wall panel rails 87 and the ceiling rails 24 and 26.

The embodiment disclosed in FIG. 25 comprises a wall panel 199 having a plurality of spring loaded bullet catches 201 extending from a side wall 204 into the threaded screw groove 78 of the corner post 58. A spring 201a is mounted in a housing 200 behind each of the bullet catches to bias the catches outwardly, and a pair of strips 202 and 203 made of compressible material are bonded to the wall 204 of the panel to provide light-tight seals along the edges of the panel 199.

It will be appreciated that the partition wall panels may be constructed of opaque material or may include glass panes or other transparent or translucent material. Furthermore, doors may be hung on the corner posts to provide closures for various modules, as the floor plan of the area may dictate.

Another embodiment of a partition wall arrangement is shown if FIGS. 28 and 29 wherein the partition wall comprises a pair of wall members 206a and 206b mounted between an exemplary lower partition wall rail 87 and a ceiling rail 26. In this embodiment the panels 206a and 206b may preferably be constructed of opaque material such as wood, metal or the like.

Mounting brackets 207 are securely fastened to the confronting walls of the rails 26 and 87 by means of threaded screws 208. Each of the mounting brackets 207 comprises a flat base plate 209 which abuts the confronting wall of its corresponding rail and a pair of vertical legs 210 which extend from the base plate 209. At each of the two ends of the base plate 209 is formed a bead 211 which extends in the same vertical direction as the legs 210.

Mounted on an inner wall 212 of each of the panels 206a and 206b is a mounting clip 213 having a recess 214 formed therein for receiving a corresponding bead 211. A gasketing member 216 is mounted on the upper and lower edges of each of the panels and extends the entire length thereof to provide a light-tight seal between the panels and the rails.

Mounted on each of the legs 210 of the upper mounting bracket 207 is a magnetic member 217 secured to the leg by means of a fastening device 218. The magnetic members 217 may extend the entire length of the panel or may comprise a plurality of individual magnets spaced along the upper edge of each of the panels. Similarly the mounting bracket 207 may extend along the entire lengths of rails 26 and 87 or, in the alternative, may comprise a plurality of individual brackets situated at various spaced locations along the rails.

In mounting the panels 206a and 206b the bottom edges thereof are first moved into place as shown in the dashed lines in FIG. 26 such that the bead 211 of the lower mounting bracket 207 is received in the recess 214 of its corresponding mounting clip 213. Then the panel is raised to a vertical position as shown in full lines. If the panels 206a and 206b are formed of metal the upper edges thereof are held in place by means of the magnets 217. If the panels are formed of wood or the like non-magnetic material then, of course, magnetic material must be embedded in or otherwise mounted on the panels at the properly spaced locations.

After the panels 206a and 206b have been raised into assembled position it is apparent that the lower edges thereof cannot be moved laterally because of the locking engagement of the beads 214 and the recesses 211. The upper edges of the panels 206a and 206b are restrained against lateral movement by the forces acting thereon due to the magnetic members 217.

Where the outer surfaces of the panels are flat erection tools including suction cups may be used for placing the panels in place as well as for removing the panels upon dismantling of the partition wall. Similar apparatus including suction cups may be conveniently utilized in erecting and dismantling the other embodiments of the partition wall arrangements.

The embodiment disclosed in FIGS. 30 and 31 comprises a pair of glass panels 217a and 217b. A thin layer of compressible material 218 surrounds the edges of the glass panels and is disposed between the glass and a groove 219 formed in a mounting flange 220.

Each of the flanges is laterally recessed as at 221 and secured by means of adhesive or the like; within each of the recesses 221 is a magnetic member 222.

Mounted on the confronting walls of the rails 26 and 87 are mounting brackets 223 secured thereto by means of fastening devices 224. A metal rod 226 is secured in overlying relation on each of the brackets 223 for abutting engagement with the magnetic members 222 in the assembled position of the panels 217a and 217b.

Referring to FIG. 31, in the recesses 221 of the lower mounting flanges 220 are flanges 227 each of which comprises a vertical leg 228 having a bead 229 formed at the distal end thereof. Each of the beads 229 is disposed between a pair of short vertical legs 230 and 231 to prevent lateral movement thereof. Sealing members 232 are provided between the panels 217a and 217b and the rails 26 and 87 to provide a light-tight seal therebetween.

The panels 217a and 217b are assembled in the same manner as panels 206a and 206b of FIGS. 28 and 29, that is, by first placing the bead 29 of each of the flanges 28 between its respective vertical legs 230 and 231 while its corresponding panel is at an angle with respect to the vertical, and then raising the panel to a vertical position at which the magnetic members 222 will maintain the panel securely in place.

The previously mentioned panel mounting apparatus comprising suction cups may also be advantageously utilized in erecting and dismantling the glass panels 217a and 217b of FIGS. 30 and 31.

FIGS. 32 and 33 serve to provide an overall composite view of many of the components of the present architectural system of interior modular construction. The figures illustrate components used in more than one arrangement and include such additional features as electrical outlet plates 233 which may be mounted over an aperture 234 formed in a corner post 58, electrical conductors 236 extending through the pedestal assembly 23 and up into the corner post 58 to terminate at a receptacle box 237, etc. When in assembled condition, the corner posts 58 may be prevented from moving downwardly under loads which may be imposed thereon by means of a cam arrangement 236 mounted on the insert 73 for abutting the bottom wall of the corner post 58.

It is apparent from the foregoing that the architectural system of modular construction disclosed herein provides for maximum flexibility of the floor plan while requiring minimum time and effort in rearrangement. Since the floor system, the ceiling system and the partition wall system are all separate but interdependent, and since the corner posts are separate from the partition wall panels and the partition wall panels overlie the partition wall rails and the ceiling rails rather than the floor and ceiling panels, the corner posts and partition wall panels can be erected and removed without any modification of the floor and ceiling systems. Other features such as the threaded screw grooves in the rails and corner posts, the connectors for the floor and ceiling rails, the pedestal assemblies, etc. also add to the many advantages of this improved and complete system of modular construction.

Although minor modifications might be suggested by those versed in the art, it should be understood that we wish to embody within the scope of the patent warrented hereon all such modifications as reasonably come within the scope of our contribution to the art.

We claim as our invention:

1. An architectural system for modular construction comprising, a first and a second series of floor rails extending horizontally in end-to-end relation and in spaced parallel columns and rows to form a plurality of rectangular floor sections on a floor line, a first and a second series of ceiling rails corresponding to and aligned directly above the floor rails to form a plurality of rectangular ceiling sections on a ceiling line, a plurality of floor rail supporting pedestals adapted for placement on a structural floor below said floor line at the junctions of said first and second series of floor rails for supporting the rails at the ends thereof, a plurality of ceiling mounting rods adapted to be suspended from a structural ceiling above said ceiling line in vertical alignment with said pedestals and at the junctions of said first and second series of ceiling rails for supporting the ceiling rails at the ends thereof, a plurality of floor and ceiling panels, flanges formed on said floor and ceiling rails for supporting said floor and ceiling panels between said rails, rendering the panels removable without interference with or the necessity of removing the rails, a plurality of vertical partition corner posts adapted to be selectively mounted at any of the corners of said floor and ceiling sections, means for releasably securing the ends of said posts to said floor and ceiling rails, and wall panels adapted to be selectively releasably mounted between said posts and said rails and in vertical alignment with said floor and ceiling rails to provide an easily alterable modular arrangement of partition walls without interfering with overlying or requiring the removal of said floor or ceiling panels.

2. The architectural system as defined in claim 1 and including means on said pedestals for vertically adjusting the pedestals from above the floor line.

3. The architectural system as defined in claim 1 and including means on said pedestals and on said corner posts for providing lateral adjustment of the lower ends of said posts.

4. The architectural system as defined in claim 1 and including vertically and horizontally adjustable means for suspending said ceiling rail mounting rods from the structural concrete ceiling.

References Cited

UNITED STATES PATENTS

| | | | |
|---|---|---|---|
| 3,189,140 | 6/1965 | Luss | 52—122 X |
| 3,222,030 | 12/1965 | Thorpe | 52—122 X |
| 3,327,438 | 6/1967 | Cooper | 52—484 X |

FOREIGN PATENTS 1,023,063     1966     Great Britain.

JOHN E. MURTAGH, Primary Examiner

U.S. Cl. X.R.

52—241, 264, 282, 475, 484, 495